(12) United States Patent
Binder

(10) Patent No.: US 9,130,232 B2
(45) Date of Patent: Sep. 8, 2015

(54) BATTERY GRIDS AND METHODS FOR MANUFACTURING SAME

(75) Inventor: Richard R. Binder, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 213 days.

(21) Appl. No.: 13/579,867

(22) PCT Filed: Mar. 2, 2011

(86) PCT No.: PCT/US2011/026836
§ 371 (c)(1),
(2), (4) Date: Aug. 17, 2012

(87) PCT Pub. No.: WO2011/109493
PCT Pub. Date: Sep. 9, 2011

(65) Prior Publication Data
US 2012/0308897 A1 Dec. 6, 2012

Related U.S. Application Data

(60) Provisional application No. 61/310,023, filed on Mar. 3, 2010.

(51) Int. Cl.
| | |
|---|---|
| *H01M 4/64* | (2006.01) |
| *H01M 4/73* | (2006.01) |
| *H01M 2/16* | (2006.01) |
| *H01M 2/18* | (2006.01) |
| *H01M 4/74* | (2006.01) |
| *H01M 4/62* | (2006.01) |
| *H01M 10/06* | (2006.01) |

(52) U.S. Cl.
CPC *H01M 4/73* (2013.01); *H01M 2/16* (2013.01); *H01M 2/18* (2013.01); *H01M 4/745* (2013.01); *H01M 4/627* (2013.01); *H01M 10/06* (2013.01); *Y02T 10/7016* (2013.01); *Y10T 29/49108* (2015.01)

(58) Field of Classification Search
None
See application file for complete search history.

(56) References Cited

U.S. PATENT DOCUMENTS

| | | |
|---|---|---|
| 345,511 A | 7/1886 | Khotinsky |
| 487,834 A | 12/1892 | Griscom |

(Continued)

FOREIGN PATENT DOCUMENTS

| | | |
|---|---|---|
| CN | 1515043 A | 7/2004 |
| CN | 1833896 A | 9/2006 |

(Continued)

OTHER PUBLICATIONS

International Search Report, International Application No. PCT/US2011/026836.

(Continued)

*Primary Examiner* — Patrick Ryan
*Assistant Examiner* — Jose Colucci Rios
(74) *Attorney, Agent, or Firm* — Boardman & Clark LLP

(57) ABSTRACT

A grid for a battery is disclosed. The battery grid includes an electrically conductive grid body having opposed top and bottom frame elements. At least one of the frame elements has a cross section with coined edges. The battery grid also includes a plurality of interconnecting electrically conductive grid elements spanning between the opposed top and bottom frame elements defining a grid pattern. Methods of forming a battery grid are also disclosed.

20 Claims, 3 Drawing Sheets

(56) References Cited

U.S. PATENT DOCUMENTS

| | | |
|---|---|---|
| 669,085 A | 3/1901 | Heidel |
| 1,129,690 A | 2/1915 | Knobloch |
| 1,347,873 A | 7/1920 | Rabe |
| 1,364,760 A | 1/1921 | Holland et al. |
| 1,381,008 A | 6/1921 | Polk |
| 1,500,219 A | 7/1924 | Benner |
| 1,524,610 A | 1/1925 | Ahlgren |
| 1,528,963 A | 3/1925 | Adams et al. |
| 1,600,083 A | 9/1926 | Webster |
| 1,675,644 A | 7/1928 | Reginald et al. |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |
| 2,148,371 A | 2/1939 | Galloway |
| 2,193,782 A | 3/1940 | Smith |
| 2,261,053 A | 10/1941 | De Martis et al. |
| 2,282,760 A | 5/1942 | Hauel |
| 2,882,760 A | 5/1942 | Haud |
| 2,503,970 A | 4/1950 | Rupp |
| 2,727,079 A | 12/1955 | Chubb et al. |
| 2,821,565 A | 1/1958 | Lander et al. |
| 2,881,105 A | 4/1959 | Gullett |
| 2,882,568 A | 4/1959 | Leaberry et al. |
| 3,009,459 A | 11/1961 | Ruben |
| 3,023,468 A | 3/1962 | Hord et al. |
| 3,249,981 A | 5/1966 | Sabatino |
| 3,349,067 A | 10/1967 | Hill et al. |
| 3,398,024 A | 8/1968 | Barnes at al. |
| 3,408,236 A | 10/1968 | Hartesveldt |
| 3,453,145 A | 7/1969 | Duddy |
| 3,466,193 A | 9/1969 | Hughel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,853,626 A | 12/1974 | Daniels et al. |
| 3,909,293 A | 9/1975 | Hammond et al. |
| 3,923,545 A | 12/1975 | Marguiles et al. |
| 3,926,247 A | 12/1975 | Geiger |
| 3,929,513 A | 12/1975 | Mao |
| 3,933,335 A | 1/1976 | Maruyama et al. |
| 3,933,524 A | 1/1976 | Hughel et al. |
| 3,945,097 A | 3/1976 | Daniels, Jr. et al. |
| 3,947,936 A | 4/1976 | Wheadon |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,159,908 A | 7/1979 | Rao et al. |
| 4,189,533 A | 2/1980 | Sugalski |
| 4,196,757 A | 4/1980 | Hug et al. |
| 4,196,769 A | 4/1980 | Feagin |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Qureshi |
| 4,327,163 A | 4/1982 | Wheadon |
| 4,345,452 A | 8/1982 | Eberle |
| 4,349,067 A | 9/1982 | Wirtz et al. |
| 4,351,891 A | 9/1982 | McCartney, Jr. et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkler et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yanik |
| 4,614,630 A | 9/1986 | Pluim, Jr. |
| 4,629,516 A | 12/1986 | Myers |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | McLoughlin et al. |
| 4,906,540 A | 3/1990 | Hoshihara et al. |
| 4,932,443 A | 6/1990 | Karolek et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |
| 5,093,970 A | 3/1992 | Senoo et al. |
| 5,098,799 A | 3/1992 | Bowen et al. |
| 5,149,605 A | 9/1992 | Dougherty |
| 5,221,852 A | 6/1993 | Nagai et al. |
| 5,223,354 A | 6/1993 | Senoo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |
| 5,434,025 A | 7/1995 | Rao et al. |
| 5,462,109 A | 10/1995 | Vincze |
| 5,506,062 A | 4/1996 | Flammang |
| 5,540,127 A | 7/1996 | Binder et al. |
| 5,543,250 A | 8/1996 | Yanagihara et al. |
| 5,578,398 A | 11/1996 | Jenkins et al. |
| 5,578,840 A | 11/1996 | Scepanovic et al. |
| 5,580,685 A | 12/1996 | Schenk |
| 5,582,936 A | 12/1996 | Mrotek et al. |
| 5,595,840 A | 1/1997 | Hanning et al. |
| 5,601,953 A | 2/1997 | Schenk |
| 5,611,128 A | 3/1997 | Wirtz |
| 5,643,696 A | 7/1997 | Rowlette |
| 5,660,600 A | 8/1997 | Vyas |
| 5,660,946 A | 8/1997 | Kump et al. |
| 5,691,087 A | 11/1997 | Rao et al. |
| 5,834,141 A | 11/1998 | Anderson et al. |
| 5,851,695 A | 12/1998 | Misra et al. |
| 5,858,575 A | 1/1999 | Chen |
| 5,874,186 A | 2/1999 | Rao et al. |
| 5,948,566 A | 9/1999 | Larsen et al. |
| 5,952,123 A | 9/1999 | Hatanaka et al. |
| 5,958,274 A | 9/1999 | Dobie et al. |
| 5,958,625 A | 9/1999 | Rao |
| 5,989,749 A | 11/1999 | Kao |

(56) References Cited

U.S. PATENT DOCUMENTS

| | | | |
|---|---|---|---|
| 6,026,722 A * | 2/2000 | Lopez Ascaso et al. | 83/100 |
| 6,037,081 A | 3/2000 | Kashio et al. | |
| 6,057,059 A | 5/2000 | Kwok et al. | |
| RE36,734 E | 6/2000 | Binder et al. | |
| 6,086,691 A | 7/2000 | Lehockey et al. | |
| 6,117,594 A | 9/2000 | Taylor et al. | |
| 6,122,820 A | 9/2000 | Dawood et al. | |
| 6,180,286 B1 | 1/2001 | Rao et al. | |
| 6,203,948 B1 | 3/2001 | Kao et al. | |
| 6,245,462 B1 | 6/2001 | Kao et al. | |
| 6,267,923 B1 | 7/2001 | Albert et al. | |
| 6,274,274 B1 | 8/2001 | Schaeffer et al. | |
| 6,291,097 B1 | 9/2001 | Barker et al. | |
| 6,291,104 B1 | 9/2001 | Yoshihora et al. | |
| 6,312,852 B1 | 11/2001 | Wagner | |
| 6,342,110 B1 | 1/2002 | Palumbo | |
| 6,348,283 B1 * | 2/2002 | Mas et al. | 429/161 |
| 6,351,878 B1 | 3/2002 | Rao | |
| RE37,804 E | 7/2002 | Mattan | |
| 6,419,712 B1 | 7/2002 | Haverstick | |
| 6,442,811 B1 | 9/2002 | Dawood et al. | |
| 6,444,366 B1 | 9/2002 | Kawano et al. | |
| 6,454,977 B1 | 9/2002 | Kwok et al. | |
| 6,468,318 B1 | 10/2002 | Meadows et al. | |
| 6,582,855 B1 | 6/2003 | Miyamoto et al. | |
| 6,592,686 B2 | 7/2003 | Palumbo | |
| 6,649,306 B2 | 11/2003 | Prengaman | |
| 6,749,950 B2 | 6/2004 | Zhang | |
| 6,755,874 B2 | 6/2004 | Chen et al. | |
| 6,797,403 B2 | 9/2004 | Clark et al. | |
| 6,833,218 B2 | 12/2004 | Mann | |
| 6,921,611 B2 | 7/2005 | Schaeffer et al. | |
| 6,953,641 B2 | 10/2005 | Chen | |
| 7,398,581 B2 | 7/2008 | Chen | |
| 7,767,347 B2 | 8/2010 | Kao et al. | |
| 7,799,463 B2 | 9/2010 | Schaeffer et al. | |
| 8,034,488 B2 | 10/2011 | Schaeffer et al. | |
| 2002/0015891 A1 | 2/2002 | Schaeffer et al. | |
| 2002/0088515 A1 | 7/2002 | Aust et al. | |
| 2003/0059674 A1 | 3/2003 | Mann et al. | |
| 2003/0096170 A1 | 5/2003 | Fujiwara et al. | |
| 2004/0033157 A1 | 2/2004 | Schaeffer | |
| 2004/0038129 A1 | 2/2004 | Mann | |
| 2004/0187986 A1 | 9/2004 | Schaeffer | |
| 2005/0112470 A1 | 5/2005 | Taylor et al. | |
| 2005/0150092 A1 | 7/2005 | Chen | |
| 2005/0164091 A1 | 7/2005 | Schaeffer et al. | |
| 2006/0096079 A1 | 5/2006 | Farina | |
| 2008/0289161 A1 * | 11/2008 | Chen | 29/2 |
| 2009/0291359 A1 | 11/2009 | Wirtz et al. | |
| 2012/0047719 A1 | 3/2012 | Schaeffer | |
| 2012/0058394 A1 | 3/2012 | Schaeffer | |

FOREIGN PATENT DOCUMENTS

| | | |
|---|---|---|
| CN | 101233635 A | 7/2008 |
| CN | 201514971 U | 6/2010 |
| EP | 0029788 | 6/1981 |
| EP | 0065996 | 12/1982 |
| EP | 0348702 | 1/1990 |
| EP | 0589549 | 3/1994 |
| EP | 0795917 A2 | 9/1997 |
| EP | 0969108 | 1/2000 |
| EP | 1041164 | 10/2000 |
| GB | 570953 | 7/1945 |
| GB | 1377039 | 5/1973 |
| GB | 1 376 162 A | 12/1974 |
| GB | 2127614 A | 7/1983 |
| GB | 2170343 | 7/1986 |
| JP | 55-046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56-138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 58-155660 | 9/1983 |
| JP | 59134563 | 8/1984 |
| JP | 60037663 | 2/1985 |
| JP | 60039766 | 3/1985 |
| JP | 60-78570 | 5/1985 |
| JP | 60143570 | 7/1985 |
| JP | 60-150556 | 8/1985 |
| JP | 60167267 | 8/1985 |
| JP | 60167268 | 8/1985 |
| JP | 60198055 | 10/1985 |
| JP | 61124052 | 6/1986 |
| JP | S62-147653 | 7/1987 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | 5036416 | 2/1993 |
| JP | 5275081 | 10/1993 |
| JP | 07-065822 | 3/1995 |
| JP | 8083617 | 3/1996 |
| JP | 8-213023 | 8/1996 |
| JP | 8287905 | 11/1996 |
| JP | 09-231995 | 9/1997 |
| JP | 10284085 | 10/1998 |
| JP | 11054115 | 2/1999 |
| JP | 11-213993 | 8/1999 |
| JP | H11512975 | 11/1999 |
| JP | 2000-164223 | 6/2000 |
| JP | 2000-340235 | 12/2000 |
| JP | 2001-229920 | 8/2001 |
| JP | 2001-524736 | 12/2001 |
| JP | 2002-260716 | 9/2002 |
| JP | 2003-36852 | 2/2003 |
| JP | 2004-165149 | 6/2004 |
| JP | 2004-199951 | 7/2004 |
| JP | 2004-521445 | 7/2004 |
| JP | 2004-253324 | 9/2004 |
| WO | WO 9927595 | 6/1999 |
| WO | WO 01/04978 A1 | 1/2001 |
| WO | WO 0104977 | 1/2001 |
| WO | WO 0153549 | 7/2001 |
| WO | WO 0215296 | 2/2002 |
| WO | WO 02054513 A2 | 7/2002 |
| WO | WO 2006127575 | 11/2006 |
| WO | WO 2008/109429 A2 | 9/2008 |
| WO | WO 2009/150485 A1 | 12/2009 |

OTHER PUBLICATIONS

Written Opinion of the International Searching Authority, International Application No. PCT/US2011/026836.
International Search Report and Written Opinion of the International Searching Authority dated Jul. 24, 2013 for PCT/US2012/062698.
Patent Abstract for AU 275685.
International Search Report dated Oct. 12, 2000 for PCT/US00/18313.
PCT Search Report dated Oct. 9, 2000 for PCT/US00/18144.
International Search Report dated Aug. 19, 2002 for PCT/US02/00390, 7 pages.
Office Action dated May 1, 2003 for U.S. Appl. No. 09/898,660.
Office Action dated Mar. 24, 2003 for U.S. Appl. No. 09/898,660.
U.S. Appl. No. 09/898,660 titled "Modification of the Shape/Surface Finish of Battery Grid Wires to Improve Paste Adhesion" by Schaeffer et al, filed Jul. 2, 2001.
Ishikawa et al., "A punched grid production process for automotive batteries" from Pb 80, 7th International Conference (1980).
Perez, "The Complete Battery Book" TAB Books, Inc., 191 pp., 1985 (no month).

(56) References Cited

OTHER PUBLICATIONS

PCT Search Report Aug. 11, 2000 for PCT/US00/12569.
S. Goodman "Plates with improved conductivity" Batteries International, pp. 88-89 (no month).
Non-Final Office Action dated Nov. 19, 2003 from U.S. Appl. No. 09/755,337.
PCT International Search Report for PCT/US98/24345 (International Filing Date Mar. 3, 1999); date of mailing Mar. 11, 1999; 2 pp.
Reply and Amendment dated Feb. 12, 2004 from U.S. Appl. No. 09/755,337.
Final Office Action dated May 19, 2004 from U.S. Appl. No. 09/755,337.
Reply and Amendment dated Jul. 19, 2004 from U.S. Appl. No. 09/755,337.
Office Action dated Jan. 7, 2003 for U.S. Appl. No. 09/755,337.
Office Action dated Jun. 18, 2003 for U.S. Appl. No. 09/755,337.
Office Action dated Sep. 16, 2002 for U.S. Appl. No. 09/755,337.
U.S. Appl. No. 09/755,337 titled "Method for Making an Alloy Coated Battery Grid" by Yu-Lin Chen.
PCT Search Report dated Oct. 6, 1999 in PCT/US99/13291.
International Search Report and Written Opinion dated Oct. 5, 2006 for International Application No. PCT/US06/019686, 2 pages.
Response dated May 28, 2009 to Office Action for EPO Application No. 067707804.0-2119, 9 pages.
Office Action dated Jan. 21, 2009 for EPO Application No. 06770804.0-2119, 3 pages.
Office Action dated Apr. 23, 2008 for EPO Application No. 06770804.0-2119, 5 pages.
Response dated Oct. 28, 2008 to Office Action for EPO Application No. 06770804.0-2119, 5 pages.
Chinese Patent Office, Office Action (with English Translation) dated Jul. 6, 2009 for Chinese Patent Application No. 200680017715.1 based on PCT/US06/019686, 12 pages.
Office Action dated Sep. 30, 2009 from U.S. Appl. No. 11/984,666.
Amendment and Response dated Dec. 30, 2009 from U.S. Appl. No. 11/984,666.
Office Action dated Jan. 19, 2010 from Brazil Patent Application No. PI 0206343-3 (with English Translation).
Office Action dated Aug. 5, 2009 (with English translation) for Chinese Patent Appln. No. 20060017715.1.
Response dated Sep. 23, 2009 for Chinese Patent Appln. No. 20060017715.1.
Traditional Lead Acid Battery Shortcomings, www.fireflyenergy.com.
Megger, Failure Modes—Lead-acid (flooded) failure modes, Battery Testing Guide, p. 7.

* cited by examiner

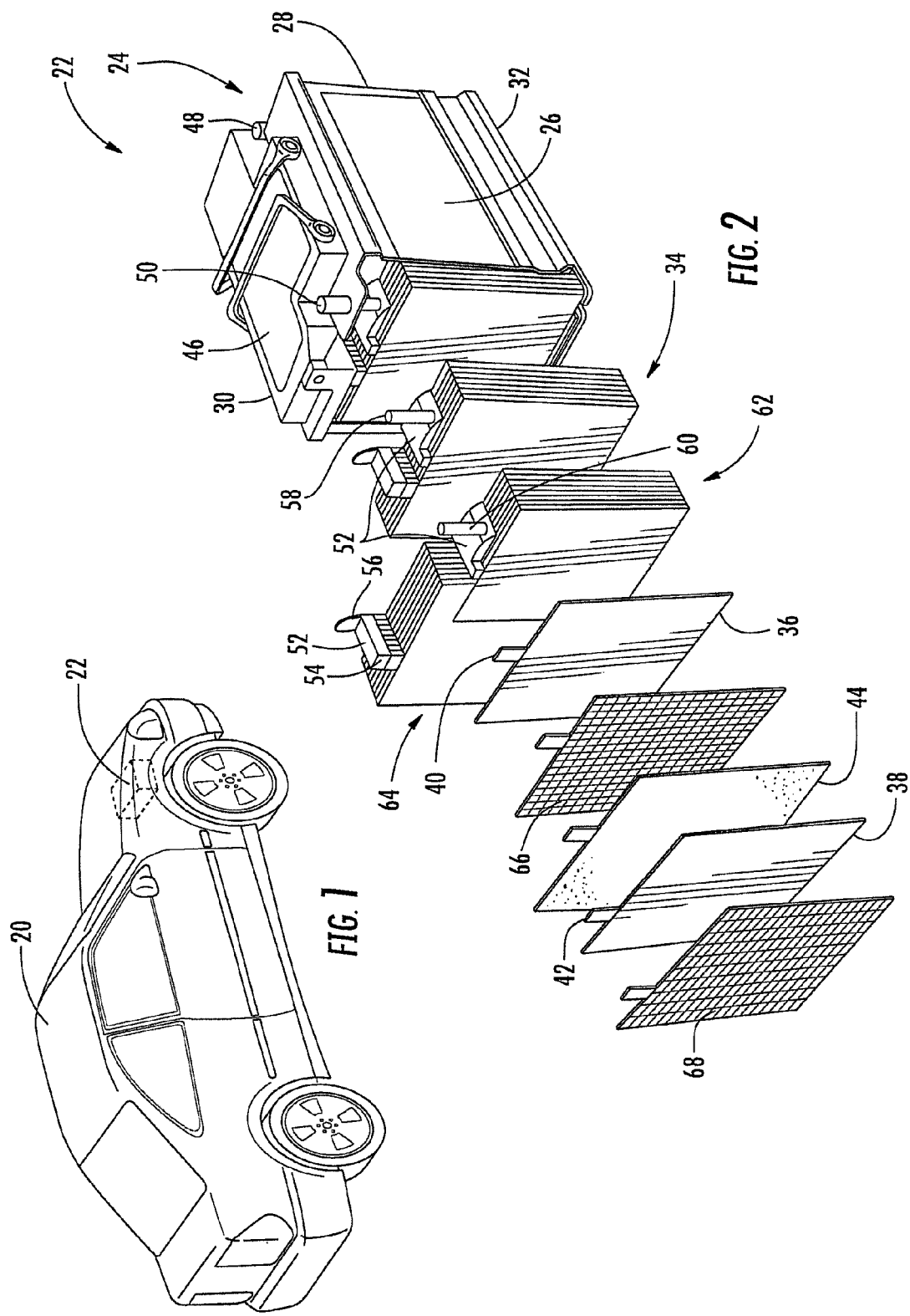

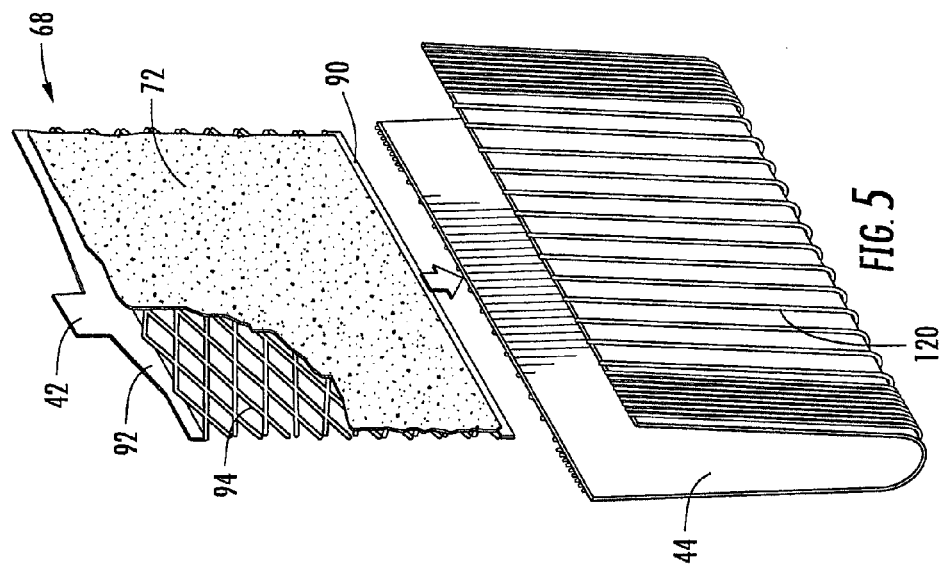
FIG. 5
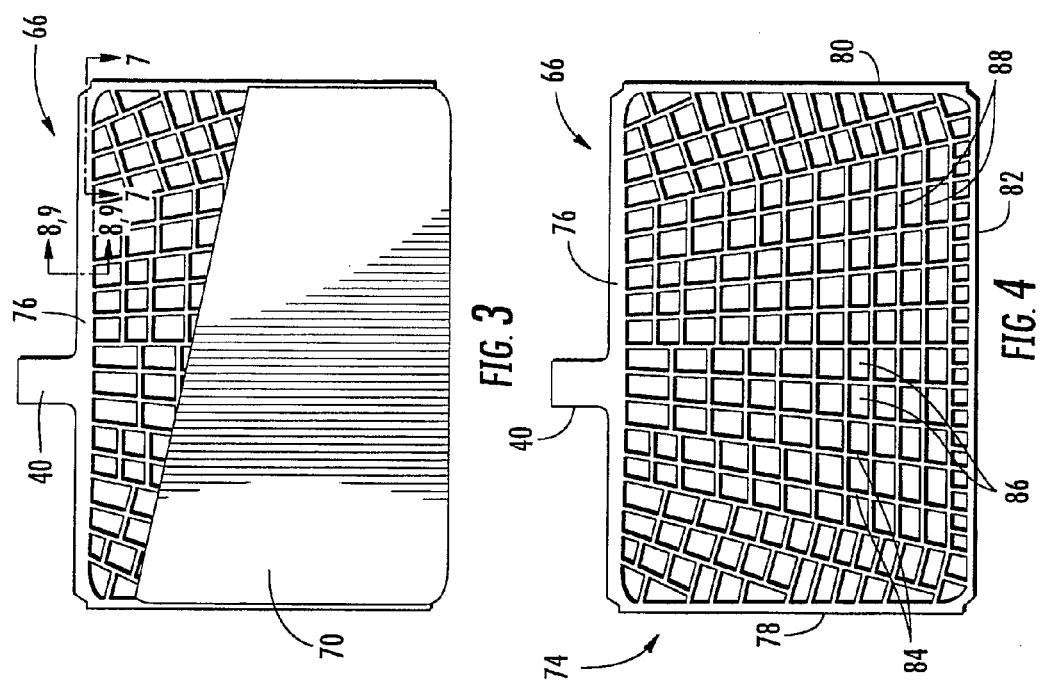
FIG. 3
FIG. 4

BATTERY GRIDS AND METHODS FOR MANUFACTURING SAME

CROSS-REFERENCE TO RELATED APPLICATIONS

This application claims the benefit of U.S. Provisional Patent Application Ser. No. 61/310,023 entitled "Battery Grids and Method for Manufacturing Same" which was filed Mar. 3, 2010, and PCT Patent Application No. PCT/US2011/026836 filed Mar. 2, 2011, the entire contents of which are hereby incorporated by reference herein in their entirety.

FIELD

The present invention relates to the field of batteries (e.g., lead-acid batteries including batteries for vehicle starting, lighting and ignition applications; marine batteries; commercial batteries; industrial batteries; batteries for use with hybrid-electric vehicles, microhybrid vehicles, etc.). The present invention more specifically relates to battery grids and methods of making battery grids.

BACKGROUND

It is known to provide electrical power storage devices, such as batteries or cells, for use in vehicles such as automobiles. For example, lead-acid batteries have been used in starting, lighting, ignition, and other applications.

It is known to provide a battery cell that is made from an anode and a cathode (electrodes) separated by a permeable dielectric separator. In short, an electrode may be manufactured by stamping or punching a continuous sheet of lead or lead alloy material. The stamped material is processed to add active material, typically in the form of electrochemical paste. The electrochemical paste is typically a material (e.g. a viscous liquid) that sets or dries on the stamped material and contracts as it cures or hardens into a solid. After the paste is provided, the stamped material is cut into individual electrode plates, which may be used in stacked batteries.

The formed or stamped grid can have imperfections on the surface of the frame elements, such as burrs and the like. In some cases, burrs may form or be formed on or near one or more of the edges, corners or ends of the battery grid. Burrs and imperfections can contribute to separator failure and short circuits, particularly at the corners where pressure on the separator is relatively greater. These imperfections on the surface of the frame elements can also catch or snag on separator material used to separate positive and negative plates or electrodes.

As a lead-acid battery is charged positive electrode active material is converted from lead sulfate/lead oxide to lead dioxide. This chemical conversion to a larger molecule size causes the active material to expand, placing stress on the electrode grid. The stress can cause the grid to cup, which cupping effect is most prominent at the edges and corners of the grid. When the plates are stacked, the effect of this cupping can be cumulative to create points of increased pressure. For example, the effect of a series of cupped plates that are cupped in the same direction is cumulative, becoming more pronounced with each successive plate. Furthermore, adjacent plates with cupped sides facing each other create pinch points, particularly at the corners where the cupping effect may more pronounced.

These effects can put excessive pressure on the separators that are provided between adjacent plates. In addition, the corners of a positive grid have been known to pierce or cut the separator material as the grid cups against the negative plate, leading to shorts and battery failure.

Moreover, battery grids have been known to grow over time as the grid goes through its lifecycle, often due to corrosion. The grid growth may result in shorting of a battery cell, and battery failure.

SUMMARY

Accordingly, a battery grid is provided. The battery grid includes an electrically conductive grid body having opposed top and bottom frame elements. At least one of the frame elements has a cross section with coined edges. The battery grid also includes a plurality of interconnecting electrically conductive grid elements spanning between the opposed top and bottom frame elements defining a grid pattern.

A method of making a plurality of battery grids is also provided. The method includes forming a strip of grid material for a battery grid and stamping material out of the strip of material to form a strip of interconnected battery grids. Each interconnected battery grid includes a grid network bordered by opposed top and bottom frame elements and opposed first and second side frame elements. The grid network has a plurality of spaced apart grid wire elements defining a plurality of open spaces in the grid network. The method also includes coining at least one frame element on the battery grids from the strip of interconnected battery grids to form deformed edges on the cross-section of the frame element, and cutting the strip of interconnected battery grids to form a plurality of battery grids.

An alternative method of making a plurality of battery grids is also provided. The method includes forming a strip of grid material for a battery grid, and forming a strip of interconnected battery grids from the strip of grid material. Each interconnected battery grid includes a grid network bordered by opposed top and bottom frame elements. The grid network has a plurality of spaced apart grid wire elements defining a plurality of open spaces in the grid network. At least one frame element from the strip of interconnected battery grids is coined to form deformed edges on the cross-section of the frame element. The strip of interconnected battery grids is cut to form a plurality of battery grids.

BRIEF DESCRIPTION OF THE DRAWINGS

Various examples of embodiments of the systems and methods according to the present disclosure will be described in detail, with reference to the following figures, wherein:

FIG. 1 is an isometric view of a vehicle including a battery according to one or more examples of embodiments;

FIG. 2 is an exploded, isometric, cut-away view of a battery according to one or more examples of embodiments;

FIG. 3 is a front plan cut-away view of a portion of a battery plate or electrode (e.g., positive battery plate) comprising a stamped grid and active material according to one or more examples of embodiments;

FIG. 4 is a front plan view of a stamped grid (e.g., positive grid) according to one or more examples of embodiments;

FIG. 5 is an isometric cut-away view of a battery plate or electrode (e.g., negative battery plate) and separator according to one or more examples of embodiments;

Figure 6:
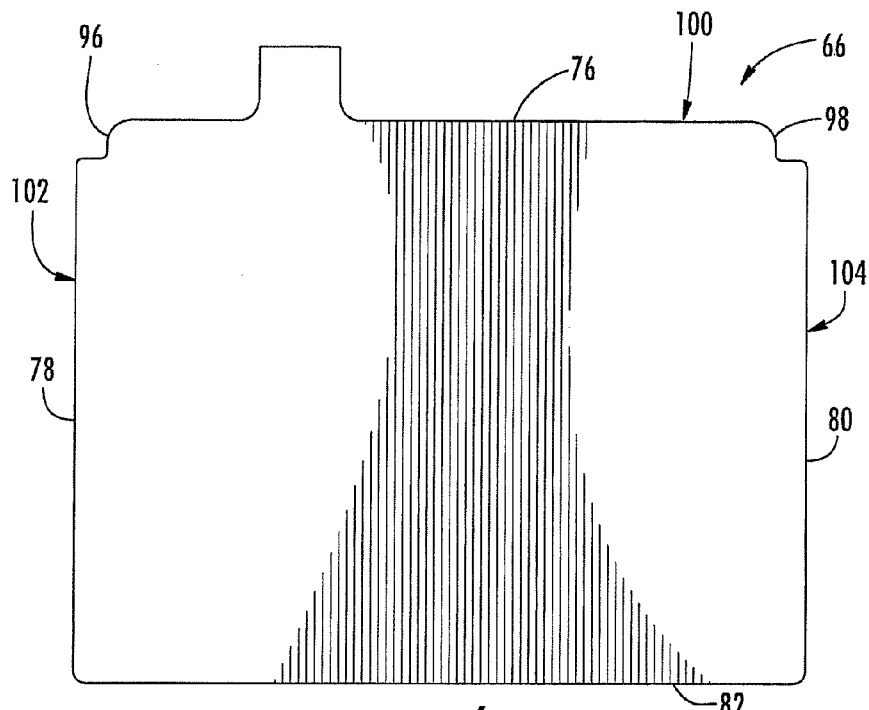
FIG. 6 is a front plan outline view of a grid according to one or more examples of embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to FIG. 1, a vehicle 20 is shown that includes a battery 22 according to one or more examples of embodiments. While the vehicle 20 is shown as an automobile, according to various alternative embodiments, the vehicle 20 may comprise any variety of types of vehicles including, among others, motorcycles, buses, recreational vehicles, boats, and the like. According to one or more examples of embodiments, the vehicle 20 uses an internal combustion engine, or a combination of internal combustion engine and battery 22, for locomotive purposes.

The battery 22 shown in FIG. 1 is configured to provide at least a portion of the power required to start or operate the vehicle 20 and/or various vehicle systems (e.g., starting, lighting and ignition systems). Further, it should be understood that the battery 22 may be utilized in a variety of applications not involving a vehicle, and all such applications are intended to be within the scope of the present disclosure.

The battery 22 shown in FIG. 1 may include any type of secondary battery (e.g., rechargeable battery). According to one or more examples of embodiments, the battery 22 is a lead-acid storage battery. Various embodiments of lead-acid storage batteries may be either sealed (e.g., non-maintenance) or unsealed (e.g., wet). According to one or more examples of embodiments, the lead-acid storage battery 22 is an unsealed lead-acid battery and periodically requires the addition of electrolyte and/or water to maintain a desired volume and/or concentration of either or both.

A lead-acid storage battery 22 according to one or more examples of embodiments is illustrated in FIG. 2. In various embodiments, the lead-acid storage battery 22 includes several cell elements which are provided in separate compartments of a container or housing 24 containing electrolyte. The illustrations provided herein relate to automotive applications, wherein groups of 8-20 plates are used in each of six stacks for producing a standard automotive 12-volt battery. In other applications, anywhere from 6 to 31 plates may be used in a stack. The number of stacks may be varied as well. It will be obvious to those skilled in the art after reading this specification that the size and number of the individual grids, the size and number of plates in any particular stack, and the number of stacks used to construct the battery may vary widely depending upon the desired end use.

In various embodiments, the battery housing 24 includes a box-like base or container and is made of a moldable resin. In various embodiments, the battery 22 includes a compartment having a front wall 26, end walls 28, a rear wall 30 and a bottom wall 32. A plurality of plate blocks 34 are connected in series according to the capacity of the lead storage battery and are accommodated in the battery container or housing 24 together with the electrolyte, which is most commonly aqueous sulfuric acid. In various examples, five cell partitions or dividers may be provided between the end walls 28, resulting in the formation of six compartments (not shown), as typically would be present in a 12-volt automotive battery. In various embodiments, a plate block 34 is located in each compartment, each plate block 34 including one or more positive plates 36 and one or more negative plates 38, each having at least one lug 40, 42, and separator 44 material placed between each positive plate 36 and negative plate 38.

A cover 46 is provided for the housing 24, and in various embodiments, the cover 46 includes terminal bushings and fill tubes to allow electrolyte to be added to the cells and to permit servicing. To prevent undesirable spillage of electrolyte from the fill tubes, and to permit exhausting of gases generated during the electrochemical reaction, a battery 22 may also include one or more filler hole caps and/or vent cap assemblies.

At least one positive terminal post 48 and one negative terminal post 50 may be found on or about the top or front compartments of the battery 22. Such terminal posts 48, 50 typically include portions which may extend through the cover 46 and/or the front 26 of the battery housing 24, depending upon the battery design. In various embodiments, the terminal posts 48, 50 also extend through a terminal post seal assembly to help prevent leakage of acid. It will be recognized that a variety of terminal arrangements are possible, including top, side or corner configurations known in the art.

FIG. 2 also shows a conventional cast-on strap 52 which includes a rectangular, elongated body portion 54 of a length sufficient to electrically couple each lug 40 or 42 in a plate set 62 or 64 and an upwardly extending member 56 having a rounded top. FIG. 2 also illustrates a cast-on strap 52 coupling lugs 42 to a negative terminal. As shown in FIG. 2, according to various embodiments, the cast-on strap 52 includes a body portion 54 coupling the respective lugs 40 or 42 in the end compartments and a post 58 or 60 formed therewith to protrude through a cover 46.

Each cell element or chapter 34 includes at least one positive plate 36, at least one negative plate 38, and a separator 44 positioned between each positive and negative plate 36, 38. Separators 44 are provided between the plates 36, 38 to prevent shorting and undesirable electron flow produced during the reaction occurring in the battery 22.

Positive and negative electrode plates 36, 38 can be classified into various types according to the method of manufacturing the same. As one example, a paste-type electrode is shown in FIGS. 3 to 5. In various embodiments, the paste type electrode includes a grid substrate 66 or 68 and an electrochemically active material or "paste" 70, 72 provided on the substrate. The grid 66 or 68 may be formed of a soft alloy containing a trace of calcium for enhancing the mechanical strength of the substrate.

Referring to FIGS. 3 to 5, the positive and negative plates 36, 38 each include a lead or lead alloy grid 66, 68 that supports an electrochemically active material 70, 72. The grids 66, 68 provide an electrical contact between the positive and negative active materials 70, 72 or paste which serves to conduct current. The grids 66, 68 also serve as a substrate for helping support electrochemically active material 70, 72 (e.g., paste) deposited or otherwise provided thereon during manufacture to form battery plates 36, 38.

As set forth in greater detail below, known arts of lead acid battery grid making include: batch processes such as book mold gravity casting; and continuous processes such as strip expansion, strip stamping, continuous casting, and continuous casting followed by rolling. Grids made from these processes tend to have unique features characteristic of the particular process and behave differently in lead-acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of the grids are stamped grids. As shown in FIGS. 3 and 4, the stamped grid 66 (e.g., a grid which may be used with a positive plate) includes a frame 74 that includes a top frame element 76, first and second side frame elements 78, 80, and a bottom frame element 82. In various embodiments, a current collection lug 40 is integral with the top frame element 76. While FIGS. 3 and 4 depict the lug 40 as offset from the center of the top frame element 76, the lug 40 may alternatively be centered or positioned closer to either the first or second side frame elements 78, 80. The top frame element 76 may include an enlarged conductive section, at least a portion of which is directly beneath the lug 40, to optimize current conduction to the lug 40. The bottom frame element 82 may be formed with one or more downwardly extending feet (not shown) for spacing the remainder of the grid 66 away from the bottom of the battery container 24.

The stamped grid 66 may include a series of grid wires 84 that define open areas 86 which help hold the active material or paste 70 that helps provide current generation. In various embodiments, at least some of the grid wires 84 increase in cross-sectional area along their length from bottom to top or have a tapered shape so as to optimize the current carrying capacity of the wires to help carry away increasing current being generated from the bottom to the top. The width and spacing of the wires between side elements 78, 80 may be predetermined so that there are substantially equal potential points across the width of the grid 66. To assist in supporting the electrochemical paste 70 and/or permit the formation of paste pellets, in various embodiments, the stamped grid 66 also includes horizontal wires 88 which are equally spaced apart and are parallel to the top and/or bottom frame elements 76, 82. As shown in FIGS. 3-4, however, at least some of the horizontal wires 88 may not be equally spread apart or parallel to the top and/or bottom frame elements 76, 82.

Various stamped grid frame and wire designs may be utilized. See, e.g., U.S. Pat. Nos. 5,582,936; 5,989,749; 6,203,948; 6,274,274; 6,921,611; and 6,953,641; and U.S. patent application Ser. Nos. 10/996,168; 11/086,525; 10/819,489; and 60/904,404, each of which are incorporated herein by reference in their entireties. It should be noted that an infinite number of designs may be utilized and therefore, it is not the intent of the following description to limit the invention to the grid frame and wire designs shown in FIGS. 3 to 5, which are presented for the purposes of illustration.

One or more examples of embodiments of an expanded metal grid 68 (e.g., a grid for the negative plate) is illustrated in FIG. 5. In various embodiments, the expanded metal grid 68 has a pattern of grid elements 94 (e.g., a diamond pattern such as that shown in FIG. 5), which is well known in the art, with a bottom frame element 90, and a top frame element 92 that is integral with a lug 42.

Referring to FIGS. 3 to 5, the cross-section of the grid wires 84 may vary depending upon the grid making process. To help improve adhesion of the battery paste 70 or 72, however, in various embodiments, the grid wires 84 may be mechanically reshaped or refinished. It should be appreciated that any number of grid wire shapes may be utilized as long as the shape provides suitable paste adhesion characteristics. For example, the cross-section of wires may be of any cross-section design including substantially oval shaped, substantially rectangular shaped, substantially diamond shaped, substantially rhomboid shaped, substantially hexagon shaped, and/or substantially octagon shaped. In the battery grid 66 or 68, each grid wire section may have a different cross-sectional configuration, or each grid wire section may have the same or a similar cross-sectional configuration. However, it is preferred that each grid wire section have the same cross-sectional configuration. Depending on the needs, a grid 66 or 68 can be deformed at the vertical wire elements only, the horizontal wire elements only, or at both the vertical and horizontal wire elements.

In various examples of embodiments, one or more grid corners are coined and/or beveled or otherwise rounded or deformed or dulled. More specifically, one or more frame elements are coined. To this end, an electrically conductive grid body is provided having opposed top and bottom frame elements 76, 82 or 92, 90 and may further include opposed first and second side frame elements 78, 80, wherein at least one of the frame elements has a transverse cross section with coined or deformed edges. As indicated, a plurality of interconnecting electrically conductive grid elements 84, 88 or 94 may span between the opposed top and bottom frame elements 76, 82 or 92, 90, and in one or more examples the opposed first and second side frame elements 78, 80, defining a grid pattern. In one or more examples of embodiments, more than one frame element has a transverse cross section with deformed or coined edges, or may include one or more deformed corner segments.

FIGS. 6-9 illustrate one or more examples of embodiments of a battery grid 66 or 68 including a frame element (e.g., 76, 78, 80, or 92) having edges, corners or ends which are beveled, rounded or coined. For ease of discussion, reference will be made to the grid 66 and corresponding frame elements 76, 78, 80, 82, but the description herein with respect to coined, rounded, deformed or shaped edges and corners may equally apply to grid 68 and its corresponding frame elements 90, 92.

Edges, corners and/or ends of the top frame element 76 may be at least partially beveled, rounded or coined. In addition, edges, corners and/or ends of opposing side elements 78, 80 may be at least partially rounded or coined. It is also contemplated that the bottom or lower element 82 may be at least partially rounded or coined in one or more examples provided herein.

More specifically, FIG. 6 illustrates an outline of a grid 66 shown in FIGS. 2-5 in which one or more edges of the grid 66 on the top frame element 76 have been beveled, rounded or coined. FIG. 6 illustrates first and second corners 96, 98 of the grid 66 in which the top frame element 76 and/or the side frame element 78 or 80 has been coined. The grid 66 illustrated in FIG. 6 includes a top frame element 76 that has a deformed corner segment 96 or 98, and in particular two deformed corner segments adjacent the respective side elements 78, 80. The first and second coined corners or edges 96, 98, in the illustrated example, have been pressed or recessed inwards or otherwise inset from the outer edge 100 of the top frame element 76 and outer edges 102, 104 of corresponding side frame element 78 or 80. The coined edge 96, 98 may be formed in any suitable shape or geometric configuration for use in a battery. In addition to the shaped edge, the coined edge may also be smoothed to reduce or eliminate burrs and other surface imperfections.

Figure 7:
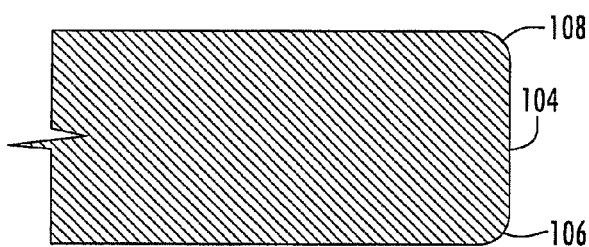
FIG. 7 is a cross-sectional view of a portion of the top frame element of the grid shown in FIG. 6, taken along line 7-7 of FIG. 3 in one or more examples of embodiments.

FIG. 7 illustrates a cross-sectional view of the top frame element 76 shown in FIG. 3. As can be seen, one or more edges 106, 108 of the frame element 80 have been beveled, rounded or coined. The outer edges or corners 106, 108 of either or both side frame elements 78 or 80 may be coined. FIG. 7 illustrates a single frame element 80 for purposes of example only and identical components and features may exist on opposing frame element 78. As one non-limiting example, the opposing side frame elements 78, 80 may have corresponding coined segments. The coining may be continuous along the outer edge 104 or corner of the frame element 80, or may be patterned, or may be on a single or multiple segments. In the illustrated example, the coined edges are shown as rounded surfaces. However, the coined edge may be formed in any suitable shape or geometric configuration for use in a battery. In addition to the shaped or coined edge 106, 108, the area of the frame element may also be smoothed to reduce or eliminate burrs and other surface imperfections. While the top frame element 76 and side frame element 80 are shown, more than one frame element may have like features, including but not limited to the top, bottom, and side frame elements 76, 78, 80, 82.

Figure 8:
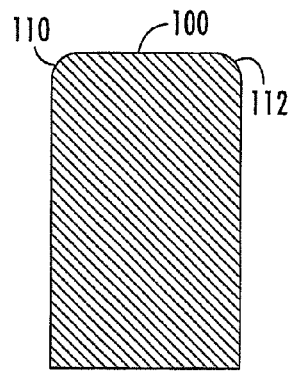
FIG. 8 is a cross-sectional view of a portion of the top frame element of the grid shown in FIG. 6, taken along line 8-8 of FIG. 3 in one or more examples of embodiments.

FIG. 8 illustrates a cross-sectional view of the top frame element 76 shown in FIG. 3. As can be seen, one or more edges 110, 112 of top frame element 76 have been beveled, rounded or coined. As seen in FIG. 8, the top edges or corners 110, 112 of the top frame element 76 may be coined. The coining may be continuous along the top edge 100 or corner of the frame element, or may be patterned, or may be on a single or multiple segments. In addition to the shaped or coined edge, the area of the frame element may also be smoothed to reduce or eliminate burrs and other surface imperfections. In the illustrated example, the coined edges are shown as rounded surfaces. However, the coined edge may be formed in any suitable shape or geometric configuration for use in a battery. While the top frame element 76 is shown, more than one frame element may have like features, including but not limited to the top, bottom, and side frame elements 76, 78, 80, 82.

Figure 9:
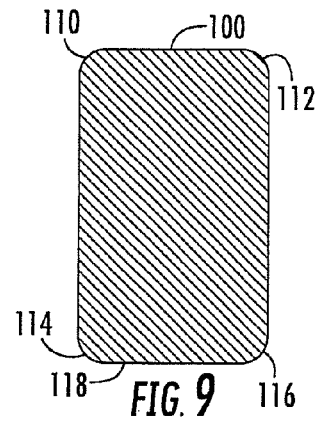
FIG. 9 is a cross-sectional view of one or more alternative examples of the portion of the top frame element shown in FIG. 8, for the grid shown in FIG. 6, taken along line 9-9 of FIG. 3.

FIG. 9 illustrates a cross-sectional view of one or more examples of an alternative embodiment of the top frame element 76 shown in FIG. 3. As can be seen, more than two edges of top frame element 76 have been beveled, rounded or coined. In FIG. 8, in addition to the top edges or corners 110, 112 on the top surface 100 of the top frame element 76 the bottom edges 114, 116 on the bottom surface 118 of the top frame element 76 may be coined. The coining may be continuous along the edge or corner of the frame element, or may be patterned, or may be on a single or multiple segments. In addition to the shaped or coined edge, the area of the frame element may also be smoothed to reduce or eliminate burrs and other surface imperfections. In the illustrated example, the coined edges are shown as rounded surfaces. However, the coined edge may be formed in any suitable shape or geometric configuration for use in a battery. While the top frame element 76 is shown, more than one frame element may have like features, including but not limited to the top, bottom, and side frame elements 76, 78, 80, 82.

Active material or paste 70 or 72 is carried by the grid 66 or 68. The active material or paste 70 or 72 is typically a lead-based material (e.g., PbO, $PbO_2$, Pb or $PbSO_4$ at different charge/discharge stages of the battery) that is pasted, deposited or otherwise provided onto the grids 66 or 68. The paste 70 or 72 composition may be determined by power requirements, cost and battery environment, as it is known in the art. In various embodiments, the active material 70 or 72 of a lead-acid battery is prepared by mixing lead oxide, sulfuric acid and water. The lead oxide reacts with the sulfuric acid to form mono-, tri-, and/or tetrabasic lead sulfate(s). Dry additives, such as fiber and expander, may also be added to the active material 70 or 72. For example, in various embodiments, expanders such as finely-divided carbons (e.g., lampblack or carbon black), barium sulfate and various lignins may be included in the active material 70 or 72. In various embodiments, the mixture is then dried and water is re-added to form a paste 70 or 72 of the desired consistency.

The active material 70 provided on the positive grid 66 (e.g., lead dioxide [$PbO_2$]), is typically in micro-particle form, so that the electrolyte is allowed to diffuse and permeate through the lead dioxide microparticles on the positive electrode plate 38. The spongy lead, the active material 72 of the negative electrode plate, is typically porous and reactive, so that the electrolyte is allowed to diffuse and permeate through the sponge lead on the negative electrode plate 40.

To prevent the separation of the active materials 70 or 72 from the grids 66 or 68 and to ensure easy handling of the active materials in the manufacture of electrodes 38, 40, a pasting paper (not shown) may be adhered or otherwise provided on at least one of the surfaces of the active material 70 or 72 as a support to the active material after deposition on the grids 66 or 68. Porous nonwoven fabric (e.g., having micron-sized pores), instead of paper, may alternatively be provided into the surface or on the active material 70 or 72 to prevent the separation and handling problems of the active material and initial high rate discharge degradation. For example, a nonwoven fabric synthesized from thermoplastic resin by spun-bonding or thermal-bonding may be used. In various embodiments, nonwoven fabric formed of one or more polyesters, polypropylenes, or viscose rayon is used.

In one or more examples of embodiments, one or more battery separators 44 are used to conductively separate the positive and negative electrodes. The separator material 44 is typically microporous to allow the through passage of ions from the positive and negative electrodes. Separators 44 for automotive batteries are typically made in continuous lengths and rolled, subsequently folded as shown in FIG. 5, and sealed along one or more of their edges to form pouches that receive a battery plate (e.g., a negative plate as shown in FIG. 5 or a positive plate 36 as shown in FIG. 2).

Separator material 44 generally has a substantially uniform thickness and a substantially uniform pore distribution. The pore distribution helps ensure an overall uniform current density during operation, thereby helping achieving a uniform charging and discharging of the electrodes and maximum battery efficiency. The thickness of a separator 44 will vary depending upon the type of battery in which it is used. In general, the thickness of the base web can range from 1 to 50 mm. For lead-acid batteries, the preferred thickness range is typically 6 to 40 mm. The height of each rib may vary over a wide range depending upon plate spacing requirements. Generally, ribs from 5 to 200 mm in height from the base are provided, with the preferred range being 10 to 100 mm.

A separator 44 generally incorporates one or more ribs 120 (e.g., as shown in FIG. 5) to help stiffen the separator. While a particular rib configuration is shown in FIG. 5, one skilled in the art will appreciate that any variety of rib configuration may be utilized depending at least in part on the grid design, plate design and/or battery.

The separator material 44 may be constructed of a variety of materials (e.g., polyolefin, rubber, phenol-formaldehyde resorcinol, glass mat, microporous PVC, and sintered PVC). In various embodiments, the separator 44 is comprised of a microporous sheet comprised of high molecular weight polyolefin. Examples of polyolefins that may be used include polyethylene, polypropylene, polybutene, ethylene-propylene copolymers, ethylene-butene copolymers, propylene-butene copolymers and ethylene-propylene-butene copolymers. In various embodiments, the separator 44 is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g., carbon black, coal dust, graphite, metal oxides and hydroxides, metal carbonates, minerals, zeolites, precipitated metal silicates, alumina silica gels, wood flour, wood fibers and bark products, glass particles, salts such as barium sulfate, inorganic salts, acetates, sulfates, phosphates, nitrates, carbonates and/or combinations thereof) may be utilized. It should also be understood that any known or later-developed wetting agents (e.g., sodium alkyl benzene sulfonate, sodium lauryl sulfate, dioctyl sodium sulfosuccinate, and isoctyl phenyl polyethoxy ethanol) may be utilized to enhance the wettability of the filler. In various embodiments, a separator 44 also includes at least one plasticizer. The plasticizer may be soluble or insoluble in water. Examples of plasticizers that may be used include organic esters, epoxy compounds, phosphate esters, hydrocarbon materials, and low molecular weight polymers. In various embodiments, the separator 44 is comprised of a stabilizer or an antioxidant. In various embodiments, conventional stabilizers or antioxidants such as 4,4 thiobis (6-tert-butyl-m-cresol) ("Santonox"), and, 2,6-di-tert-butyl-4-methylphenol ("Ionol") may be utilized.

When the separator 44 is provided with one or more ribs 120, the ribs may be formed from a number of known or later-developed polymeric compositions (e.g., the same composition as the separator, other polyolefins, polyvinyl chloride, and/or filled or foamed compositions thereof). The ribs 120 may be provided in any number of ways. For example, the ribs may be formed by extrusion (either unitarily with the sheet or separately). The ribs 120 may also be formed by grooving or embossing. When ribs are molded separately, they may be bonded or otherwise coupled to the sheet or base web by any number of methods known in the art including heat sealing or by an adhesive.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate 38, 40 for a lead-acid battery 22 is conventionally made by applying active material or paste 70 or 72 to a conductive support such as a lead alloy grid 66 or 68. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid 68 with a diamond pattern. In various embodiments, the strip is coiled on a winder, and coils of lead alloy strip are stored for later use. In various embodiments, the strip may also be rolled. To form a battery grid 68, in various embodiments, the strip is fed through an expander that cuts, slits, and stretches a strip of coil to form the grids.

The grids may be produced using other known or later-developed processes. For example, as discussed above, the substrate may be formed by a casting process (e.g., by pouring a melted alloy into a mold), a stamping process, or by continuous rolling During the manufacture of the grids or the plates, the grid wires 84, 88, 94 may be refinished or reshaped (e.g., to improve adhesion of the paste).

In one or more examples of embodiments, the battery grid 66 may be produced as part of an automated battery plate making process including grid stamping. To this end, a conventional lead or lead alloy battery grid 66 material is melted and continuously cast to form a continuous strip of grid material. The continuous strip may be rolled to modify thickness or grain structure of the grid material. The strip is then punched, such as, but not limited to, in a progressive punching operation, to form a series of interconnected battery grids 66 which have a frame composed of one or more frame elements 76, 78, 80, 82 that surround a network of grid wires 84.

Following the stamping or punching of the grid material 66 or expansion of the grid material 68, the battery grids 66 or 68, or a continuous strip of battery grids, are subjected to a coining or deformation operation. In various embodiments, at least one portion of one or more frame elements 76, 78, 80, 82 (or 90, 92) is deformed, dulled, beveled or rounded by a coining process after stamping, casting, and/or continuous rolling of the substrate. A die or other suitable device may be provided to coin or deform the frame element(s). Suitable devices for coining include, but are not limited to, a gear driving press, a mechanical press, a hydraulically driven press, and other like devices. In one or more examples of embodiments, the frame elements may be coined in a stamping station. In particular, the battery grid 66 or 68, or strip of battery grids, is subjected to a precision stamping operation in a work piece or die in which the grid material is subjected to a sufficiently high stress or force to induce plastic flow on the surface of the material or otherwise plastically deform the grid frame elements, reducing surface grain size, hardening the surface, and permitting deformation or reshaping according to the shape of the die. In the examples described herein, the coining operation results in a grid 66 or 68 having rounded or deformed corners and/or edges, examples of which are shown in FIGS. 6-9.

According to the foregoing, a method of making a plurality of battery grids 66 or 68 is provided. The method includes the steps of forming grid material out of a strip of material, such as by stamping or by expansion as one or more examples described herein, to form a strip of interconnected battery grids 66 or 68, each interconnected battery grid including a grid network bordered by opposed top and bottom frame elements 76, 82 (or 92, 90) and opposed first and second side frame elements 78, 80. The grid network has a plurality of spaced apart grid wire elements 84 (or 94) defining a plurality of open spaces 86 in the grid network. One or more frame elements 76, 78, 80, 82 (or 90, 92) of the grid 66 or 68 is coined to form deformed corners or edges on the transverse cross-section of the frame element. The coining step may include coining or deforming the battery grids 66 or 68 at the corner segments (e.g., segments 96, 98) of the frame elements.

Following the coining of the grid 66 or 68, the active material or paste 70 or 72 is then applied to or otherwise provided (e.g., pasted by a conventional paster) on the expanded strip or wire grid 66 or 68. In various embodiments, one or more pasting materials or pasting papers (not shown) may be provided on one or both surfaces of the active material 70 or 72. In various embodiments, the pasting materials or paper may be provided in a continuous process.

Each of the grids are cut to form a plurality of battery grids 66 or 68. The grids 66 or 68, active material 70 or 72 and pasting material or paper may be fed to a divider where the strip is cut into plates 36 or 38. Plates 36 or 38 cut from the strip may be flattened or otherwise modified to help smooth out any uneven regions of paste 70 or 72. In various embodiments, the plates 36, 38 pass (e.g., on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators 44 are typically produced by a process that comprises blending a composition of high molecular weight polyolefin, an inert filler material, and/or a plasticizer, forming the composition into sheet form, and subsequently extracting a portion of the inert filler and/or plasticizer from the sheet using a solvent.

After curing, the plates 36, 38 are assembled into batteries. Groupings of individual battery plates may be assembled, enveloped, interleaved or otherwise separated with separator material 44, and provided together to form plate sets 62, 64. For example, in one common battery design, every other plate (e.g., each negative plate) in the battery set is inserted into a battery separator 44 in the form of an envelope. The envelope acts as a separator between the plate in the envelope and the adjoining plates in the battery set. The plate sets 62,64 are assembled in a container 24 to help form a battery 22.

During assembly, the positive lugs 40 of the battery plates 36 are coupled together and the negative lugs 42 of the battery plates 38 are coupled together. This is typically accomplished using cast-on straps 52 formed by taking assembled battery stacks, inverting them, and dipping the lugs 40, 42 into molten lead provided in a mold. To permit current to flow throughout the battery 22, cast-on straps 52 of stacks are joined or coupled. Moreover, terminal electrodes 58, 60 are provided which extend through the cover 46 or casing to permit electrical contact with a vehicle's electrical system or other system requiring or intended to use battery power.

In various embodiments, the battery housing 24, including the cover 46, is provided containing the battery cells. In various embodiments, the battery housing 24 is submerged in acidic electrolyte fluid in order to fill the battery housing 24 with electrolyte fluid through the fill tube holes in the battery cover 46. After filling the battery housing 24 with electrolyte fluid, the battery 22 is removed from the electrolyte fluid. Any residual electrolyte fluid coating, dust, and other debris may be washed away to prepare the battery 22 for shipment. Before washing the battery housing 24 external surfaces, the fill tube holes may be plugged to prevent washing fluid from entering the battery housing 24.

Following the initial wash, the batteries are electrochemically formed by passage of current to convert the lead sulfate or basic lead sulfate(s) to lead dioxide (positive plates 36) or lead (negative plates 38). This is referred to as the "formation" process.

After the electrodes are prepared and placed in a battery 22, the battery is charged. As it is charged, the positive electrode active material 70 is converted from lead sulfate (15-20%)/lead oxide (75-90%) to lead dioxide (65-90%).

Various advantages are provided by the one or more examples of embodiments described herein which include one or more plates or grids including a frame element with one or more edges, corners or ends that are deformed (e.g. beveled, rounded or coined). In the examples of embodiments provided herein, one or more grid corners are coined and/or beveled or otherwise rounded or deformed or dulled. Coining helps reduce or eliminate corners or other features that may otherwise cause the battery grid to be more prone to contribute to separator or battery failure. Coined frame element corners and edges maintain stamped material, grid, and/or electrode plate stability and strength. In particular, coining plastically deforms the grid frame elements while hardening the surface and retaining the toughness and ductility of the material below the surface. Further, rounding or deforming the surface and particularly the upper edges of the top frame element, may act to redirect the stress and change the direction of grid growth (e.g., as may be caused by corrosion) over the lifetime of the battery away from the vertical direction.

In addition to the foregoing advantages, coining helps reduce or remove any burrs formed during the punching or stamping process and helps reduce or eliminate corners or other features that may otherwise be more prone to contribute to separator failure. For example, coined frame elements, and in particular a top frame element and/or side frame elements or one or more of the edges, corners or ends of said elements, minimizes the incidence of battery failure due to short circuits between adjacent positive and negative plates. Coined or deformed frame elements reduce damage and/or tearing of the separator material which may be caused by surface imperfections on a battery grid. Therefore, coining of battery grid frame elements reduces and/or eliminates imperfections in the frame element surface or surfaces, such as burrs and the like, and reduces the risk of separator deterioration and/or a short-circuit.

In addition, as indicated, the chemical conversion that occurs during charging of the battery leads to a larger molecule size which causes the active material to expand, placing stress on the electrode grid. The stress can cause the grid to cup, which cupping effect is most prominent at the edges and corners of the grid. When the plates are stacked, the effect of this cupping can be cumulative to create points of increased pressure. For example, the effect of a series of cupped plates that are cupped in the same direction is cumulative, becoming more pronounced with each successive plate. Furthermore, adjacent plates with cupped sides facing each other create pinch points, particularly at the corners where the cupping effect may more pronounced. These effects put excessive pressure on separators that are provided between adjacent plates. Deforming, dulling, beveling, or rounding the areas more susceptible to these effects, and in particular the edges, corners, and/or ends of one or more frame elements, such as but not limited to the top frame element, reduces the risk of separator deterioration and/or short-circuit of the battery.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or electrodes as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present invention.

What is claimed is:

1. A grid for a battery comprising an electrically conductive grid body having opposed top and bottom frame elements, wherein at least one of the frame elements has an entire length and a coined edge which spans the entire length of the frame element, and a plurality of interconnecting electrically conductive grid elements spanning between the opposed top and bottom frame element defining a grid pattern.

2. The grid of claim 1, wherein the at least one frame element is the top frame element.

3. The grid of claim 1, wherein the electrically conductive grid body further comprises opposed first and second side frame elements.

4. The grid of claim 3, wherein each of the frame elements has a cross section with deformed edges.

5. The grid of claim 1, wherein the top frame element has a deformed corner segment.

6. The grid of claim 1, wherein the grid body has a plurality of deformed corner segments.

7. A battery having the grid of claim 1.

8. A method of making a plurality of battery grids, the method comprising:

forming a strip of grid material for a battery grid;
stamping material out of the strip of material to form a strip of interconnected battery grids, each interconnected battery grid including a grid network bordered by opposed top and bottom frame elements and opposed first and second side frame elements, each element having at least one edge and an entire length, the grid network having a plurality of spaced apart grid wire elements defining a plurality of open spaces in the grid network;
coining at least one side of at least one frame element along the entire length on the battery grids from the strip of interconnected battery grids;
cutting the strip of interconnected battery grids to form a plurality of battery grids.

9. The method of claim 8, wherein the coining step also comprises coining the battery grids at a corner segment of the frame elements.

10. The method of claim 8, wherein the stamping step includes punching the grid material out of the strip of material.

11. The method of claim 8, wherein the battery grid is a positive or a negative battery grid.

12. The method of claim 8, wherein both the first and second frame elements are coined along their entire lengths.

13. The grid of claim 1, wherein the bottom frame element and the top frame element have a cross-section with a coined edge.

14. The grid of claim 1, wherein a corner of the grid is inset from the outer edge of the frame element.

15. The grid of claim 1, wherein the coined edge is continuous along the outer edge of the frame element.

16. The grid of claim 1, wherein the grid elements have a cross section which is deformed.

17. A battery plate including the grid of claim 1.

18. A grid for a battery comprising an electrically conductive grid body having opposed top and bottom frame elements and opposed side frame elements, wherein at least one of the frame elements has an entire length and a coined edge spanning the entire length, a plurality of interconnecting electrically conductive horizontal grid elements spanning between the opposed side frame elements, a plurality of interconnecting electrically conductive vertical grid elements spanning between the opposed top and bottom frame elements, and a plurality of interconnecting electrically conductive vertical grid elements which span from a top element to termination at an intersection with a horizontal grid element, defining a grid pattern.

19. The grid for a battery of claim 3, wherein the grid network is comprised of substantially vertical and horizontal wire elements including a plurality of substantially vertical wire elements spanning from the top element to termination at an intersection with a horizontal wire element.

20. The method of claim 8, wherein the grid network is comprised of substantially vertical and horizontal wire elements including a plurality of substantially vertical wire elements spanning from the top element to termination at an intersection with a horizontal wire element.

* * * * *

UNITED STATES PATENT AND TRADEMARK OFFICE
CERTIFICATE OF CORRECTION

Page 1 of 1

PATENT NO. : 9,130,232 B2
APPLICATION NO. : 13/579867
DATED : September 8, 2015
INVENTOR(S) : Binder It is certified that error appears in the above-identified patent and that said Letters Patent is hereby corrected as shown below:

In the claims,

In column 13, Line 43, delete "element" and insert -- elements -- therefor.

Signed and Sealed this
Ninth Day of February, 2016

Michelle K. Lee
*Director of the United States Patent and Trademark Office*